(12) United States Patent
Lerner et al.

(10) Patent No.: US 7,312,928 B2
(45) Date of Patent: Dec. 25, 2007

(54) PROJECTION SYSTEM FIELD LENS

(75) Inventors: Scott Lerner, Corvallis, OR (US);
Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 103 days.

(21) Appl. No.: 11/241,325

(22) Filed: Oct. 1, 2005

(65) Prior Publication Data

US 2007/0076306 A1    Apr. 5, 2007

(51) Int. Cl.
*G02B 3/00* (2006.01)
*G02B 3/08* (2006.01)

(52) U.S. Cl. ...................................... 359/649; 359/741

(58) Field of Classification Search ......... 359/649–651
See application file for complete search history.

(56) References Cited

U.S. PATENT DOCUMENTS

| | | | |
|---|---|---|---|
| 5,351,151 A | | 9/1994 | Levy |
| 5,589,982 A | * | 12/1996 | Faklis et al. ................. 359/565 |
| 5,745,289 A | * | 4/1998 | Hamblen ..................... 359/565 |
| 5,760,850 A | * | 6/1998 | Nakanishi et al. ............. 349/5 |
| 5,779,351 A | | 7/1998 | Erickson et al. |
| 5,844,355 A | | 12/1998 | Wang et al. |
| 6,014,232 A | | 1/2000 | Clarke |
| 6,163,349 A | | 12/2000 | Nakanishi et al. |
| 6,680,762 B2 | | 1/2004 | Fukuda et al. |
| 6,714,349 B2 | | 3/2004 | Nam |
| 6,831,707 B2 | | 12/2004 | Fukuda |
| 6,831,783 B2 | * | 12/2004 | Hoshi .......................... 359/569 |
| 6,894,840 B2 | | 5/2005 | Yamanaka et al. |
| 7,150,531 B2 | * | 12/2006 | Toeppen ........................ 353/7 |
| 2001/0013977 A1 | * | 8/2001 | Tadic-Galeb et al. ....... 359/649 |
| 2002/0113911 A1 | | 8/2002 | Fukuda |
| 2002/0131022 A1 | | 9/2002 | Shibatani et al. |
| 2002/0196552 A1 | | 12/2002 | Alden |
| 2003/0001986 A1 | | 1/2003 | Fukuda et al. |
| 2003/0174293 A1 | | 9/2003 | Hubel et al. |
| 2004/0021955 A1 | | 2/2004 | Wolfe |
| 2004/0222384 A1 | | 11/2004 | Lee et al. |

FOREIGN PATENT DOCUMENTS

| | | |
|---|---|---|
| EP | 0 294 867 A1 | 12/1988 |
| EP | 1 072 923 A2 | 1/2001 |

OTHER PUBLICATIONS

Texas Instruments, Single-Panel DLP Projection System Optics, Application Report, Discovery DLPA002, Mar. 2005.
Arthur Davis et al., P-95: Fresnel Lenses in Rear Projection Displays, Technical Report P-95, Jun. 2001.
Fresnel Lenses, Fresnel Technologies, Inc., copyright 2003.

(Continued)

Primary Examiner—Jordan M. Schwartz

(57) ABSTRACT

A projection system includes a modulator and a field lens. The modulator is to modulate light in accordance with image data. The field lens is to at least partially collect the light modulated by the modulator. The field lens has a number of elements. Each element has a wedged shape different than wedged shapes of neighboring elements.

13 Claims, 6 Drawing Sheets

OTHER PUBLICATIONS

V. Arrizon et al., Non-paraxial illuminator based on a single low-resolution pixelated lens, Optics Communications, Dec. 1, 2001.

Victor Arrizon et al., Self-apodization of low-resolution pixelated lenses, Applied Optics, Aug. 10, 1999.

E. Carreon et al., Analysis and design of pixelated diffractive elements in the Fresnel domain, Proceedings of SPIE, vol. 3951 (2000).

Build Your Own Home Theater Project, Lumenlab.com, copyright 2003-2004.

* cited by examiner

PROJECTION SYSTEM FIELD LENS

BACKGROUND

Projection-type display devices are generally devices that integrate light sources, optics systems, electronics, and other components for projecting data such as images, video, documents, and spreadsheets from computers or video devices onto walls or front or rear screens, for large-image viewing. They are popular among business users who give presentations as part of their job responsibilities. Newer projectors can weigh as little as a few pounds, making them well suited for business travelers. As the quality of projection technology has improved, projectors are also finding their way into peoples' homes for high-definition television (HDTV) and other applications.

Some projection-type display devices rely on optical or light modulators. A modulator may modulate light in accordance with the pixels of image data, by reflecting, refracting, diffracting, or transmitting the light based on the pixels of the image data. Once the light has been modulated by the modulator, it can be collected by a collector or field lens for ultimate projection by a projection lens outwards from the display device. For optimal image quality, the field lens may have to be nominally the same size as the modulator (e.g., relatively large) and free of aberrations and other defects. The type of field lens used in a projection system, or a projector, can therefore impact the quality and cost of the projection system or projector.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
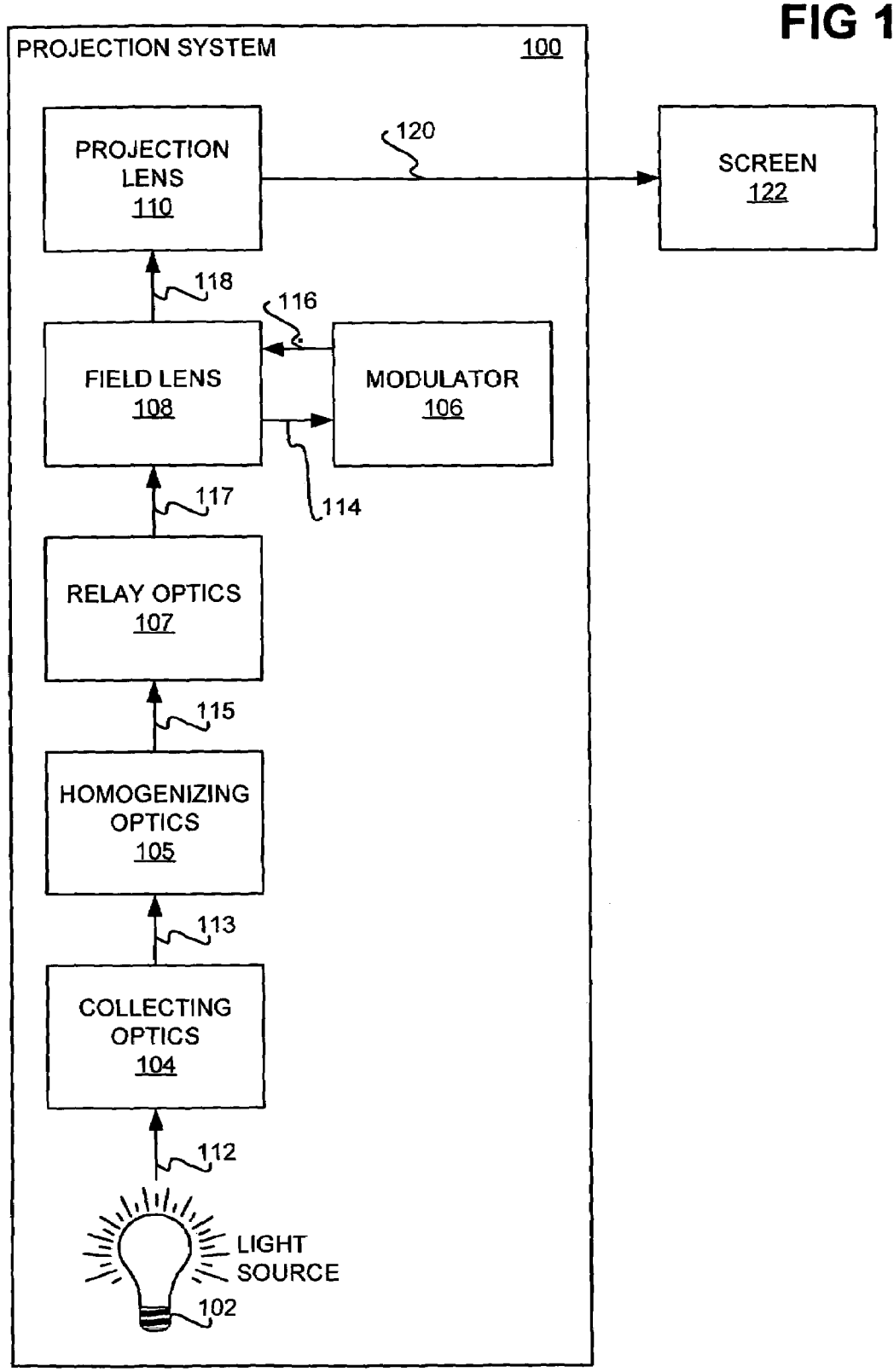
FIG. 1 is a diagram of a rudimentary projection system, according to an embodiment of the invention.

FIG. 1 shows a representative projection system 100 according to an embodiment of the invention. The system 100 may be implemented as a projector. As can be appreciated by those of ordinary skill within the art, the system 100 includes components specific to a particular embodiment of the invention, but may include other components in addition to or in lieu of the components depicted in FIG. 1. The projection system 100 includes a light source 102, a collimating lens 104, a light modulator 106, a field lens 108, and a projection lens 110.

The light source 102 outputs light 112. The light source 102 may be an ultra high pressure (UHP) mercury vapor arc lamp, or another type of light source. For instance, the light source 102 may be other types of light bulbs, as well as other types of light sources such as light-emitting diodes (LED's), and so on. The light 112 output by the light source 102 is collected by collecting optics 104, resulting in the light 113, and is then homogenized by homogenizing optics 105, resulting in the light 115. The collecting optics 104 may be an ellipsoidal reflector, or another type of collecting optics. The homogenizing optics 105, for instance, may be an integrating tunnel, a lenslet array, or another type of homogenizing optics. The light 115 is relayed by relay optics 107, as the light 117, to the field lens 108 and then onto the modulator 106, as the light 114. The relay optics 107 may provide further magnification. The field lens 108 directs the light 114 to the modulator 106 and may image the optical pupil to an infinite conjugate such that the light 114 is telecentric at the modulator 106. Thus, the embodiment of the invention of FIG. 1 allows for projection system architectures that do not utilize a telecentric projection lens 110.

The modulator 106 may be a spatial light modulator, or another type of optical or light modulator. The modulator 106 may be a reflective light modulator, which reflects light, a refractive light modulator, which refracts light, a transmissive light modulator, which transmits light, or another type of light modulator, such as an interference-based modulated, which relies upon interference of light to modulate the light. As depicted in FIG. 1, the modulator 106 is a reflective light modulator, such as a digital micromirror device (DMD). The modulator 106 modulates the light 114 in accordance with image data, which may be computer data, video data, or another type of image data, and results in the light 116.

The collector or field lens 108 collects the light 116 and focuses it to a projection lens 110. The projection lens 110 projects the resulting light 120 outward from the projection system 100, onto a screen 122 or other surface. The screen 122 may be a front screen or a rear screen, such that the projection system 100 may be a front-projection system or a rear-projection system. The user of the projection system 100, and other individuals able to see the screen 122, are then able to view the image data.

Figure 2:
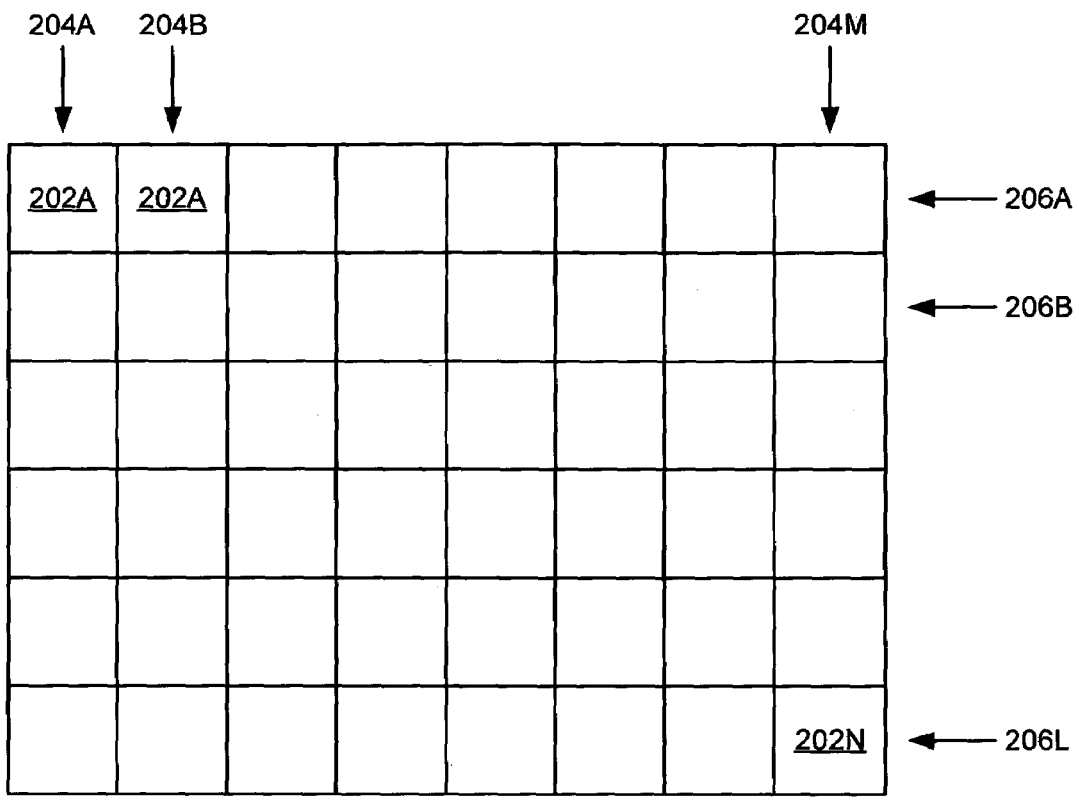
FIG. 2 is diagram of a front view of a collector or field lens, according to an embodiment of the invention.

FIG. 2 shows a front view of the field lens 108 in a plane defined by the two dimensions of an x-axis 208 and a y-axis 210, according to an embodiment of the invention. The plane of the view of the field lens 108 in FIG. 2 is that which is perpendicular to the light 116 of FIG. 1 that impinges the field lens 108. The field lens 108 has a number of elements 202A, 202B, . . . , 202N, collectively referred to as the elements 202. As depicted in FIG. 2, the elements 202 are equally sized and, within the plane defined by the x-axis 208 and the y-axis 210, are rectangular or square in shape.

However, in other embodiments, the elements 202 may be differently sized, and may have shapes other than rectangles or squares within the plane defined by the x-axis 208 and the y axis 210. Because the field lens 108 has the elements 202, the lens 108 may be considered as being pixelated in one embodiment of the invention.

The elements 202 are depicted in FIG. 2 as being organized in a grid defined by columns 204A, 204B, . . . , 204M, collectively referred to as the columns 204, and rows 206A, 206B, . . . , 206L, collectively referred to as the rows 206. In other embodiments, however, the elements 202 may be organized in a manner other than a grid. There are forty-eight of the elements 202 in FIG. 2, along M=eight columns and L=six rows. However, this limited number of the elements 202 depicted in FIG. 2 is for illustrative convenience and clarity, and in actuality there can be many more of the elements 202. For example, in one embodiment there may be over 500,000 of the elements 202, along M=960 columns and L=540 rows.

Figure 3:
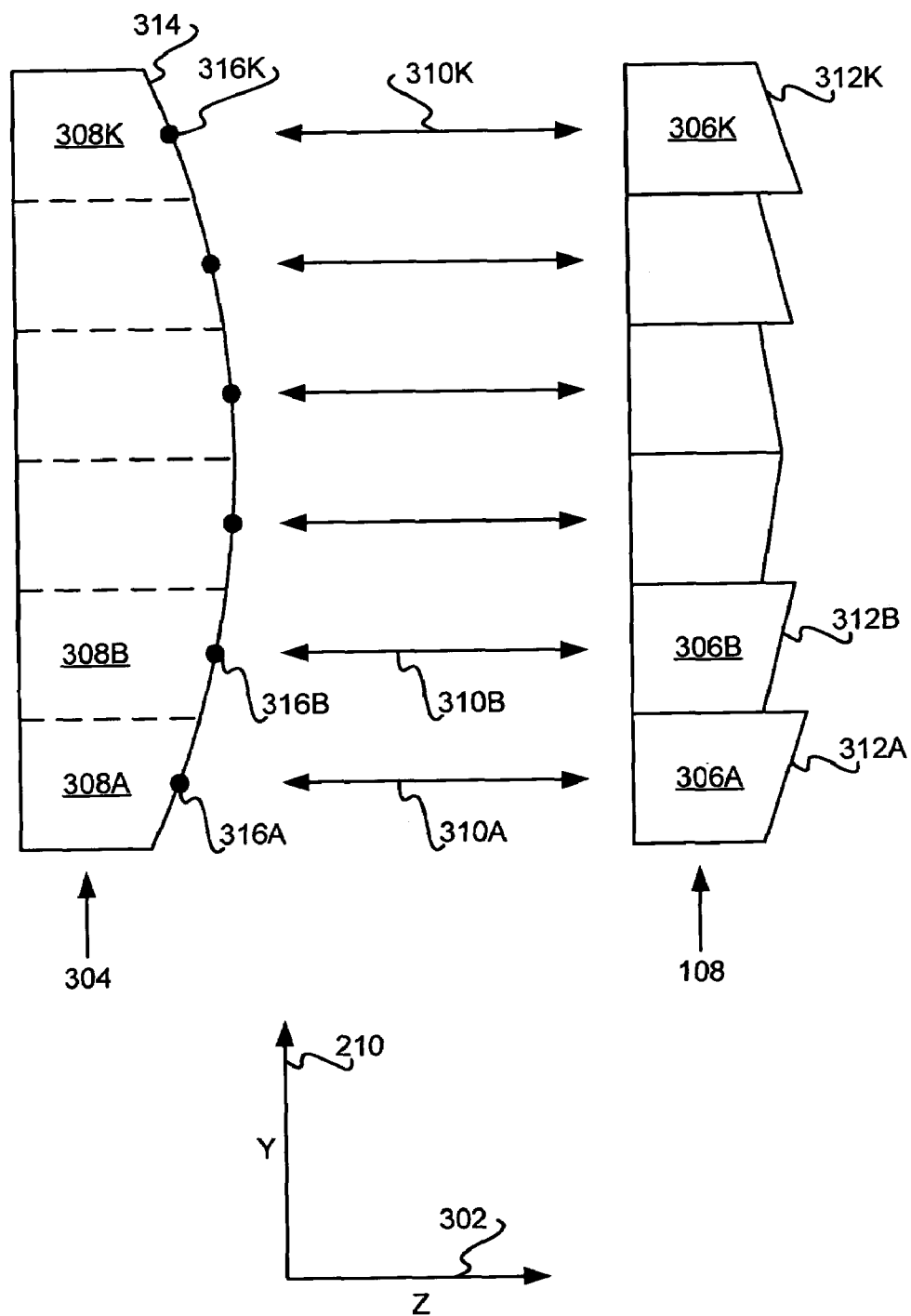
FIG. 3 is a diagram of a side view of a collector or field lens, according to an embodiment of the invention.

FIG. 3 shows a side view of the field lens 108 in a plane defined by the two dimensions of a z-axis 302 and the y-axis 210, according to an embodiment of the invention. The plane of the view of the field lens 108 in FIG. 3 is that in which the light 116 of FIG. 1 is transmitted through the lens 108 from left to right in FIG. 3. Elements 306A, 306B, . . . , 306K, collectively referred to as the elements 306, of the field lens 108 are shown in FIG. 3. The elements 306 are a subset of the elements 202 of the field lens 108 in FIG. 2, and are representative of all the elements 202 of the field lens 108. For instance, the element 306K may correspond to the element 202A of FIG. 2.

To the left in FIG. 3 is depicted a standard, or conventional, curved field lens 304 that is replaced by the field lens 108 of embodiments of the invention. For purposes of description, the conventional field lens 304 is considered as having regions 308A, 308B, . . . , 308K, collectively referred to as the regions 308, having center points 316A, 316B, . . . , 316K, collectively referred to as the center points 316. In actuality, the conventional field lens 304 is not physically divided into recognizable regions 308 having center points 316. That is, the conventional field lens 304 is just logically or theoretically divided into regions 308 for purposes of description of the field lens 108, as is provided later in the detailed description. In other words, the conventional field lens 304 is a non-pixelated curved field lens. The field lens 304 also has a curved surface 314.

The elements 306 of the field lens 108 correspond to the regions 308 of the conventional field lens 304, as indicated by the arrows 310A, 310B, . . . , 310K, collectively referred to as the arrows 310. As depicted in FIG. 3, the side profiles of the elements 306 are such that surfaces 312A, 312B, . . . , 312K, collectively referred to as the surfaces 312, of the elements 306 have a wedge shape in the plane defined by the z axis 302 and the y axis 210. The surfaces 312 are each flat or substantially flat. Furthermore, the side profile of the field lens 108 as a whole is depicted in FIG. 3 as being flat or substantially flat within the plane defined by the z-axis 302 and the y-axis 210. However, in another embodiment, the side profile of the field lens 108 as a whole may not be flat or substantially flat within the plane defined by the z axis 302 and the y axis 310, and thus may be slightly aspherical (i.e., have at least a slight curvature), and so on.

The slope of each of the surfaces 312 of the elements 306 of the field lens 108 corresponds to the slope of the surface 314 at the regions 308 of the conventional field lens 304. For instance, in one embodiment of the invention, the slope of the surface 312A of the element 306A is equal to the average slope of the surface 314 at all of its points within the region 308A, the slope of the surface 312B is equal to the average slope of the surface 314 at all of its points within the region 308B, and so on. In another embodiment of the invention, the slope of the surface 312A of the element 306A is equal to the slope of the surface 314 at the center point 316A of the region 308A, the slope of the surface 312B is equal to the slope of the surface 314 at the center point 316B, and so on.

Figure 4:
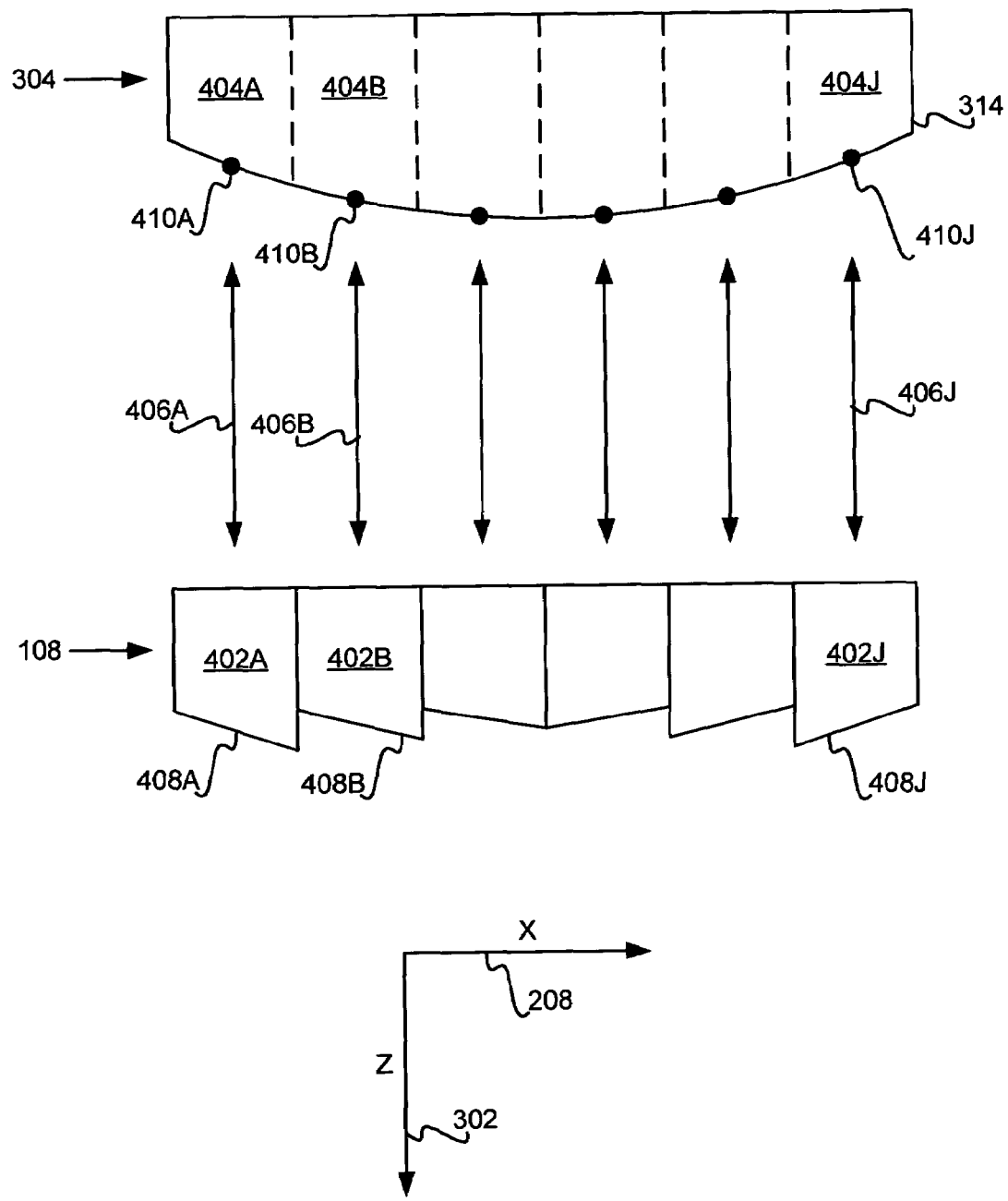
FIG. 4 is a diagram of a top view of a collector or field lens, according to an embodiment of the invention.

FIG. 4 shows a top view of the field lens 108 in a plane defined by the two dimensions of the x-axis 208 and the x-axis 302, according to an embodiment of the invention. The plane of the view of the field lens 108 in FIG. 4 is that in which the light 116 of FIG. 1 is transmitted through the lens 108 from top to bottom in FIG. 4. Elements 402A, 402B, . . . , 402J, collectively referred to as the elements 402, of the field lens 108 are shown in FIG. 4. The elements 402 are a subset of the elements 202 of the field lens 108 in FIG. 2, and are representative of all the elements 202 of the field lens 108. For instance, the element 402A may correspond to the element 202A of FIG. 2, and the element 402B may correspond to the element 202B of FIG. 2.

To the top in FIG. 4 is again depicted the standard, or conventional, curved field lens 304 that is replaced by the field lens 108 of embodiments of the invention. For purposes of description, the conventional field lens 304 is considered as having regions 404A, 404B, . . . , 404J, collectively referred as the regions 404, having center points 410A, 410B, . . . , 410J, collectively referred to as the center points 410. In actuality, the conventional field lens 304 is not physically divided into recognizable regions 404 having center points 410. That is, the conventional field lens 304 is just logically or theoretically divided into regions 404 for purposes of description of the field lens 108, as is provided later in the detailed description. In other words, the conventional field lens 304 is a non-pixelated curved field lens. The field lens 304 again has the curved surface 314.

The elements 402 of the field lens 108 correspond to the regions 404 of the conventional field lens 304, as indicated by the arrows 406A, 406B, . . . , 406J, collectively referred to as the arrows 406. As depicted in FIG. 4, the top profiles of the elements 402 are such that surfaces 408A, 408B, . . . , 408J, collectively referred to as the surfaces 408, of the elements 402 have a wedge shape in the plane defined by the z axis 302 and the x axis 208. The surfaces 408 are each flat or substantially flat. Furthermore, the top profile of the field lens 108 as a whole is depicted in FIG. 4 as being flat or substantially flat within the plane defined by the x-axis 302 and the x-axis 208. However, in another embodiment, the top profile of the field lens 108 as a whole may not be flat or substantially flat within the plane defined by the x axis 302 and the x axis 208, and thus may be slightly aspherical, and so on.

The slope of each of the surfaces 408 of the elements 402 of the field lens 108 corresponds to the slope of the surface 314 at the regions 404 of the conventional field lens 304. For instance, in one embodiment of the invention, the slope of the surface 408A of the element 402A is equal to the average slope of the surface 314 at all of its points within the region 404A, the slope of the surface 408B is equal to the average slope of the surface 314 at all of its points within the region 404B, and so on. In another embodiment of the invention, the slope of the surface 408A of the element 402A is equal to the slope of the surface 314 at the center point 410A of the region 404A, the slope of the surface 408B is equal to the slope of the surface 314 at the center point 410B, and so on.

As described in relation to FIGS. 2, 3, and 4, the elements 202 of the field lens 108 thus have a wedged shape, such as a prism shape, in the space defined by the three dimensions of the x-axis 208, the y-axis 210, and the x-axis 302. In the plane defined by the two dimensions of the x-axis 208 and the y-axis 210, the elements 202 of the field lens 108 have a rectangular or square shape. In the plane defined by the two dimensions of the z-axis 302 and the x-axis 208 or the y-axis 210, the elements 202 of the field lens 108 have a wedged shape.

Employing the field lens 108 of FIGS. 2, 3, and 4 within the projection system 100 of FIG. 1, in lieu of the conventional curved field lens 304 of FIGS. 3 and 4, provides the field lens 108 with advantages over the conventional field lens 304. The field lens 108 does not add substantial wave-front aberrations, for instance, as the conventional field lens 304 does, since the field lens 108 may be located nominally at the image plane. The field lens 108 can be smaller in size than the conventional field lens 304, while providing the same functionality as the conventional field lens 304 in collecting the light 116 from the modulator 106 and transmitting or directing it through the projection lens 110 as the light 118 in FIG. 1. The field lens 108 may also be located more closely to the modulator 106 than the conventional field lens 304 providing the same functionality can be located to the modulator 106. It is noted that in FIG. 1 the light 114 may be telecentric at the modulator 106, while the light 116 may be non-telecentric at the field lens 108.

Figure 5:
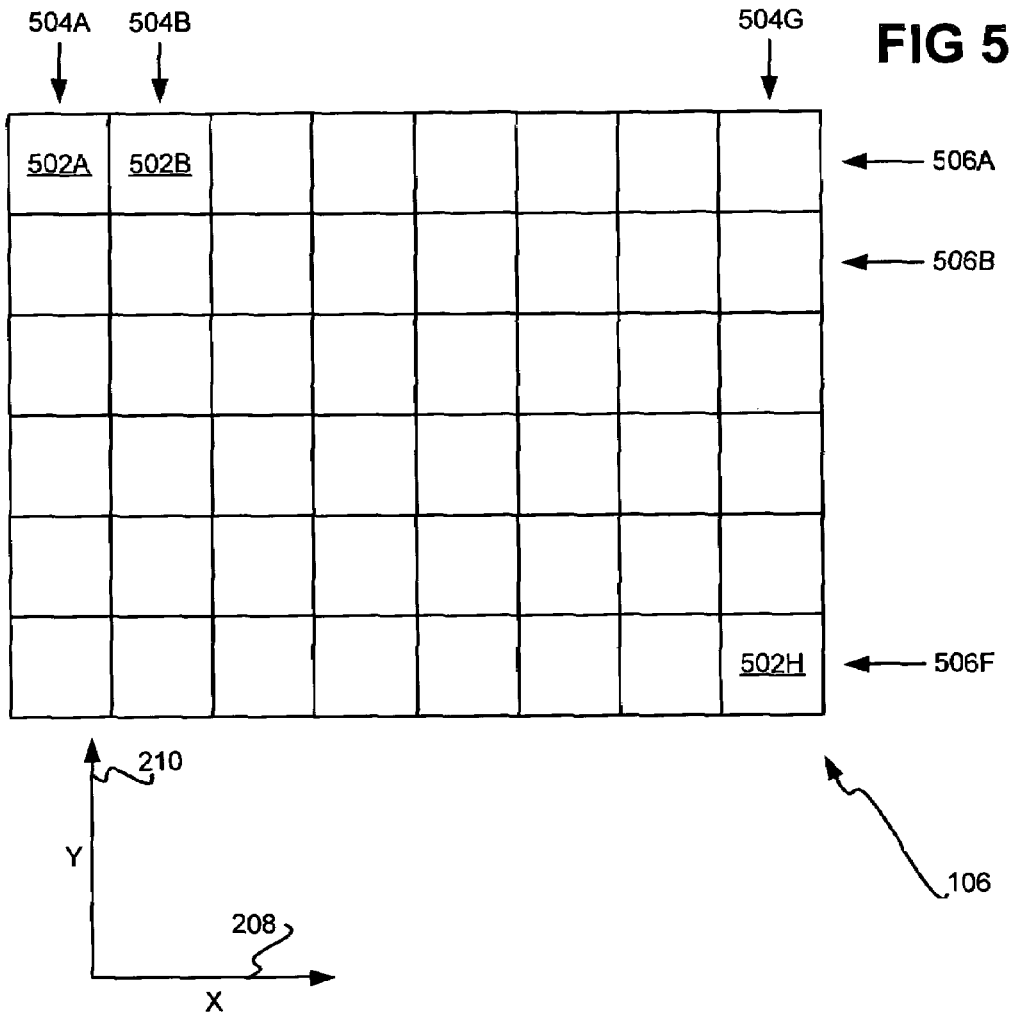
FIG. 5 is a diagram of a front view of an optical or light modulator, according to an embodiment of the invention.

FIG. 5 shows a front view of the modulator 106 in a plane defined by the two dimensions of the x-axis 208 and the y-axis 210. The modulator 106 has a number of pixel elements 502A, 502B, . . . , 502H, collectively referred to as the pixel elements 502. The pixel elements 502 are depicted in FIG. 2 as being organized in a grid defined by columns 504A, 504B, . . . , 504G, collectively referred to as the columns 504, and rows 506A, 506B, . . . , 506F, collectively referred to as the rows 506. There are forty-eight of the pixel elements 502 in FIG. 5, along G=eight columns and F=six rows. However, this limited number of the pixel elements 502 depicted in FIG. 5 is for illustrative convenience and clarity, and in actuality there can be many more of the pixel elements 502. For example, in one embodiment there may be more than 900,000 of the pixel elements 502, along G=1,280 columns and L=720 rows.

Each of the pixel elements 502 of the modulator 106 is able to independently modulate the light 116 of FIG. 1, in accordance with a corresponding pixel of image data to be projected by the projection system 100 of FIG. 1. The number of the pixel elements 502 of the modulator 106 may be equal to or different than the number of the elements 202 of the field lens 108. Where the number of the pixel elements 502 is equal to the number of the elements 202 of the field lens 108, the pixel elements 502 may be aligned to corresponding of the elements 202 of the field lens 108, or may be unaligned to corresponding of the elements 202.

For instance, where the pixel elements 502 are aligned with corresponding of the elements 202 of the field lens 108, the light modulated by each of the pixel elements 502 is directed to a corresponding one of the elements 202 of the field lens 108. For example, the pixel element 502A may correspond to the field lens element 202A, such that light modulated by the element 502A is directed to the element 202A, the pixel element 502B may correspond to the field lens element 202B, such that light modulated by the element 502B is directed to the element 202B, and so on. Where the pixel elements 502 are not aligned with the elements 202 of the field lens 108, by comparison, the light modulated by each of the pixel elements 502 may not be directed to a corresponding one of the elements 202 of the field lens 108.

Figures 6A, 6B:
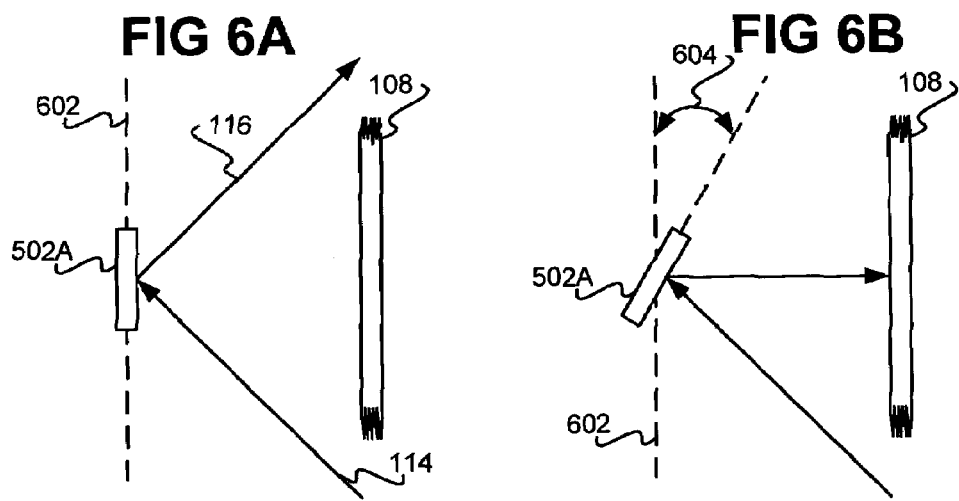
FIGS. 6A and 6B are diagrams of side views of an optical or light modulator, according to an embodiment of the invention.

FIGS. 6A and 6B show side views of the pixel element 502A of the modulator 106, as representative of all the pixel elements 502 of the modulator 106, according to an embodiment of the invention. In the embodiment of FIGS. 6A and 6B, the pixel element 502A is a reflective, or mirror, pixel element. The pixel 502A is further able to be tilted to reflect light towards the field lens 108, or away from the field lens 108, based on the value of a corresponding pixel of the image data to be projected by the projection system 100 of FIG. 1.

In FIG. 6A, the pixel element 502A has not been titled away from its base axis 602. Therefore, the light 114 that is projected onto the pixel element 502A is reflected away from the pixel element 502A, as the light 116, such that the light 116 is not directed through the field lens 108. In this situation, the light 114 is "dumped" away from the field lens 108, and the resulting light 116 is not projected outward from the projection system 100 of FIG. 1. In FIG. 6B, the pixel element 502 has been tilted away from its base axis 602 at an angle 604. Therefore, the light 114 that is projected onto the pixel element 502A is reflected away from the pixel element 502A, as the light 116, such that the light 116 is directed through the field lens 108. In this situation, the light 116 is projected outward from the projection system 100.

The field lens 108 of FIGS. 2, 3, and 4 that has been described allows the tilt angle of the pixel element 502A of the modulator 106, and thus the tilt angles of all the elements 502 of the modulator 106, to be smaller than the conventional field lens 304 providing the same functionality as the field lens 108 allows. This is advantageous, because some types of modulators may have shallow tilt angles, and cannot be employed with the conventional field lens 304 without costly and sophisticated optics. Thus, the field lens 108 allows for a larger variety of modulators to be employed within the projection system 100 of FIG. 1 in a cost-effective manner.

Figure 7:
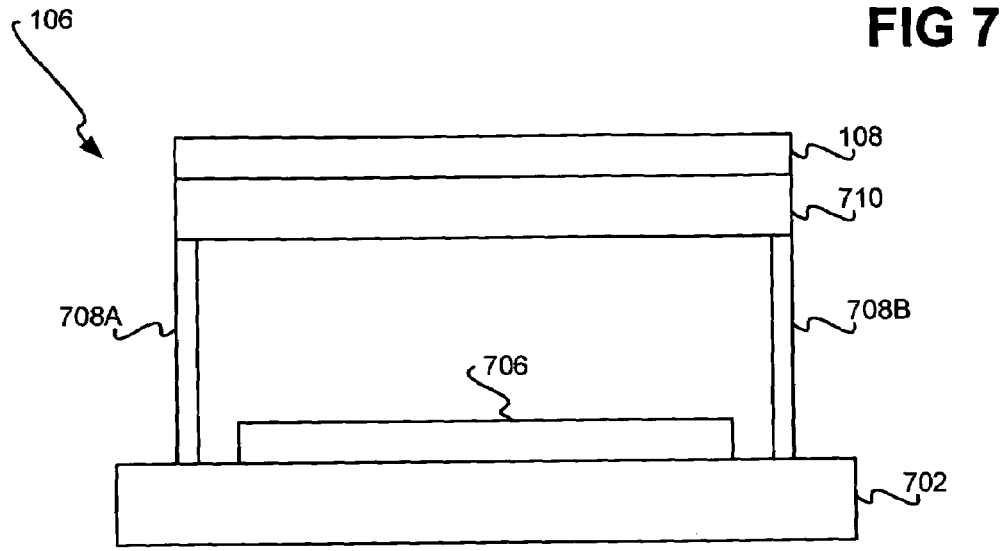
FIG. 7 is a diagram of a light modulator having an integrated field lens, according to an embodiment of the invention.

The field lens 108 has thus far been described as being separate from the modulator 106. However, FIG. 7 shows the modulator 106 in which the field lens 108 is integrated with the modulator 106, according to an embodiment of the invention. The modulator 106 is more generally a micro-electromechanical systems (MEMS) device. The modulator 106 includes a substrate 702. A modulating layer 706, which includes the pixel elements 502 of FIG. 5 that have been described, is mounted to the substrate 702. On supports 708A and 708B, collectively referred to as the supports 708, is mounted a lid portion 710 that includes the field lens 108. The lid portion 710, having the field lens 108 integrated thereon, may be considered an integrated field lens layer in one embodiment of the invention.

Figure 8:
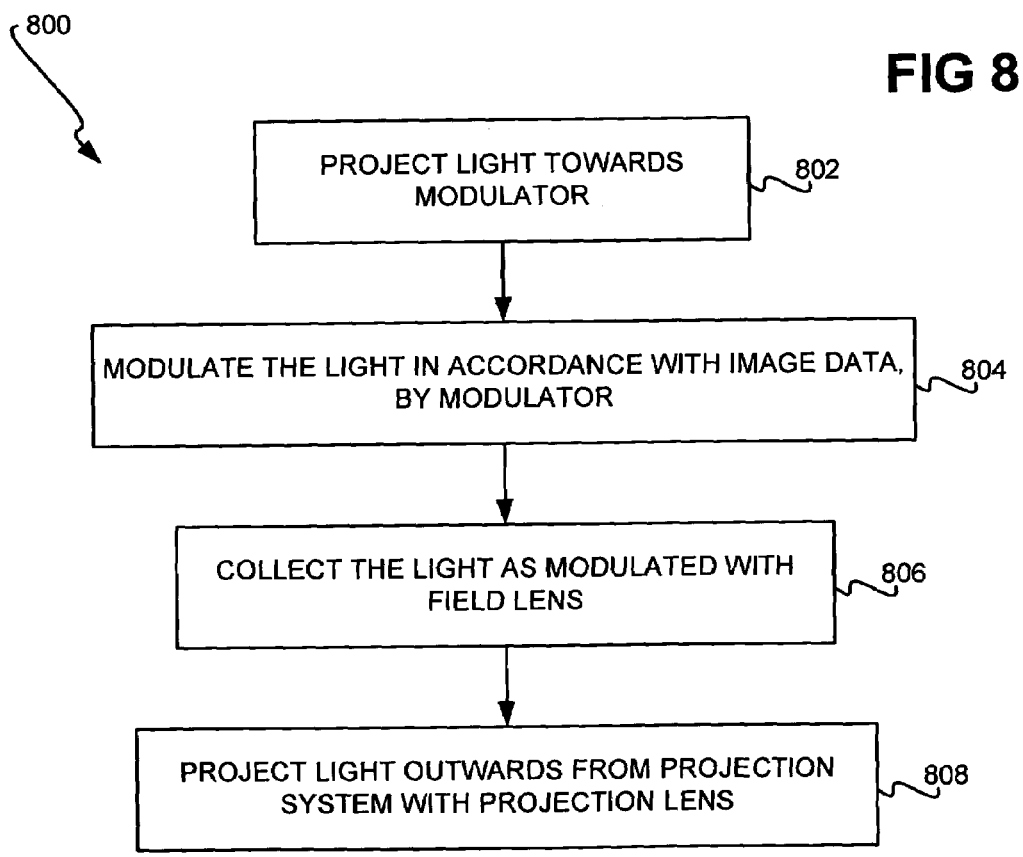
FIG. 8 is a flowchart of a method, according to an embodiment of the invention.

FIG. 8 shows a method 800, according to an embodiment of the invention. The method 800 is specifically described in relation to the projection system 100 of FIG. 1. Light is projected towards the modulator 106 (802). The modulator 106 ultimately modulates the light in accordance with image data (804). The modulated light 116 is ultimately collected by the field lens 108 of FIGS. 2, 3, and 4 that has been described (806), resulting in the light 118. Finally, the light 118 is projected as the light 120 outwards from the projection system 100 by the projection lens 110 (808), such as onto the screen 122.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. A projection system comprising:
   a modulator to modulate light in accordance with image data; and,
   a field lens to at least partially collect the light modulated by the modulator, the field lens having a plurality of elements, each element having a wedged shape different than wedged shapes of neighboring elements,
   wherein one or more of:
     the modulator has a plurality of pixel elements, and the pixel elements of the modulator are equal in number to the elements of the field lens; and,
     the elements of the field lens are square elements organized in a grid.

2. The projection system of claim 1, wherein the pixel elements of the modulator are aligned to the elements of the field lens.

3. The projection system of claim 1, wherein the pixel elements of the modulator are unaligned to the elements of the field lens.

4. The projection system of claim 1, wherein the field lens has a side profile in which a surface of the field lens is at least substantially flat.

5. The projection system of claim 1, wherein the field lens has a side profile in a surface of the field lens has at least a slight curvature.

6. The projection system of claim 5, wherein the surface within the side profile of the field lens is at least slightly aspherical.

7. The projection system of claim 1, wherein the wedged shape of each element is a prism shape.

8. The projection system of claim 1, wherein the elements are equal in size.

9. The projection system of claim 1, wherein the elements are non-equal in size.

10. The projection system of claim 1, wherein the light is telecentric upon being directed to the modulator.

11. The projection system of claim 1, wherein the field lens is part of a lid portion of the modulator.

12. The projection system of claim 1, wherein the field lens is separate from the modulator.

13. A projection system comprising:
   first means for modulating light in accordance with image data; and,
   second means for at least partially collecting the light after modulation, the second means having a plurality of elements each having a wedged shape different than wedged shapes of neighboring elements,
   wherein one or more of:
     the first means has a plurality of pixel elements, and the pixel elements are equal in number of the elements of the second means; and,
     the elements of the second means are square elements organized in a grid.

* * * * *